（12) United States Patent
Horin

(10) Patent No.: US 6,981,515 B2
(45) Date of Patent: Jan. 3, 2006

(54) BALANCED VALVE BODY FOR USE WITH NORMALLY-OPEN AND NORMALLY-CLOSED MODES OF OPERATION

(75) Inventor: Valentin Alexander Horin, Chicago, IL (US)

(73) Assignee: Siemens Building Technologies, Inc., Buffalo Grove, IL (US)

( * ) Notice: Subject to any disclaimer, the term of this patent is extended or adjusted under 35 U.S.C. 154(b) by 0 days.

(21) Appl. No.: 10/952,947

(22) Filed: Sep. 29, 2004

(65) Prior Publication Data

US 2005/0076953 A1   Apr. 14, 2005

Related U.S. Application Data

(60) Provisional application No. 60/506,889, filed on Sep. 29, 2003.

(51) Int. Cl.
*F16K 1/32* (2006.01)
(52) U.S. Cl. .................... 137/271; 251/214; 251/282
(58) Field of Classification Search ............. 137/271, 137/269; 251/214, 281, 282
See application file for complete search history.

(56) References Cited

U.S. PATENT DOCUMENTS

| 3,542,056 | A | * | 11/1970 | Chinn | ............. | 137/271 |
| 4,061,157 | A | * | 12/1977 | Hanssen | ............. | 251/214 |
| 4,137,934 | A | * | 2/1979 | Rice et al. | ............. | 137/270 |
| 4,341,370 | A | * | 7/1982 | Banks | ............. | 251/282 |
| 6,851,658 | B2 | * | 2/2005 | Fitzgerald et al. | ............. | 251/282 |

* cited by examiner

*Primary Examiner*—Kevin Lee

(57) ABSTRACT

A valve body is provided that be used as a balanced normally open valve, a balanced closed valve, or as a three way valve. The valve body incorporates a valve plug provided with a pressure port such that pressure chambers are created in the valve body when the valve is being used as either a normally open valve or a normally closed valve.

10 Claims, 6 Drawing Sheets

BALANCED VALVE BODY FOR USE WITH NORMALLY-OPEN AND NORMALLY-CLOSED MODES OF OPERATION

This application claims the benefit of U.S. Provisional Patent Application Ser. No. 60/506,889, filed Sep. 29, 2003, which is incorporated herein by reference.

FIELD OF THE INVENTION

The present invention relates to a pressure balanced valve for the volumetric control of fluid. More specifically, the present invention relates to a balanced single seated valve which can operate in a normally open mode or a normally closed mode.

CROSS-REFERENCE TO RELATED APPLICATIONS

The following application covers subject matter related to the present application: U.S. patent application Ser. No. 10/953,980 entitled "Balanced Valve Body for Use with Normally-Open and Normally Closed Modes of Operation"

BACKGROUND OF THE INVENTION

Control valves typically include a valve plug that is movable toward and away from a valve seat formed in a valve port between a fluid inlet and a fluid outlet. The movement of the valve plug is typically controlled by an actuator. The problem with existing valves is that hydraulic effects are placed on the plug due to pressure differentials in the valve. As a result, larger actuators are required to open or close the valve plug.

FIG. 1 shows a conventional two-seated balanced valve. Valve body 10 as shown in FIG. 1 comprises a pair of seat rings 15, 20 to accommodate a pair of valves plugs 25 and 30 to control the flow of liquid between inlet port 35 and outlet port 40. Valve stem 45, which is connected to an actuator, not shown, is provided to control the position of the valve plugs 25 and 30. Valve 10 is further provided with pressure chambers 50 and 55 are provided to balance the pressure of valve plugs 25 and 30 due to the pressure created on the valve plugs as fluid progresses through valve 10 between inlet port 35 and outlet port 40. The problem with such an arrangement is that in order to minimize leakage, the distance between the valve plugs 25 and 30 and the seat rings 15 and 20 needs to be nearly identical, which is difficult to accomplish. Accordingly, such as balanced valve design is generally given a lower leakage classification. What is needed is a balanced valve design without the leakage problems associated with prior balanced valve designs. Accordingly, there is currently a need to balance the differential pressures in the valve to permit operation of such valves in highest differential pressure applications than is possible with conventional valve and actuator combinations.

SUMMARY OF THE INVENTION

The present invention relates to a normally-open balanced valve. The balanced valve includes a valve body comprising an inlet port and an outlet port, the valve body further comprising a first side and a second side, the first side and the second side each provided with apertures, where the valve comprises a portion extending between said first side and said second side for dividing the valve into an inlet chamber and an outlet chamber, the valve provided with a plug provided in a position such that an opening between the inlet chamber and the outlet chamber is normally open, the plug having a first side and a second side, said plug provided with a pressure port allowing fluid to flow from said second side of said plug side of said plug to said first side of said plug into a pressure chamber provided in the valve such that fluid flows from the inlet chamber through the port into the pressure chamber to balance the fluid pressure on said plug, and a stem connected to said first side of said plug for moving said plug into a closed position when actuated.

In another embodiment, a normally closed balanced valve is provided. The balance valve includes a valve body comprising an inlet port and an outlet port, the valve body further comprising a first side and a second side, the first side and the second side each provided with apertures, the valve comprising a portion extending between the first side and the second side for dividing the valve into an inlet chamber and an outlet chamber such that an opening is provided between the inlet chamber and outlet chamber, the valve provided with a plug provided in a position such that the opening between the inlet chamber and the outlet chamber is normally closed, the plug having a first side and a second side provided with a pressure port allowing fluid to flow from the second side of the plug side of the plug to the first side of the plug into a pressure chamber provided in the valve such that fluid flows from the inlet chamber through the port into the pressure chamber to balance the fluid pressure on the plug, and a stem connected to the second side of the plug.

BRIEF DESCRIPTION OF THE DRAWINGS

The aforementioned features, advantages, and aspects of the present invention, will be apparent from the following description and accompanying drawings. Like parts are designated by like reference numbers throughout.

DETAILED DESCRIPTION

Figure 1:
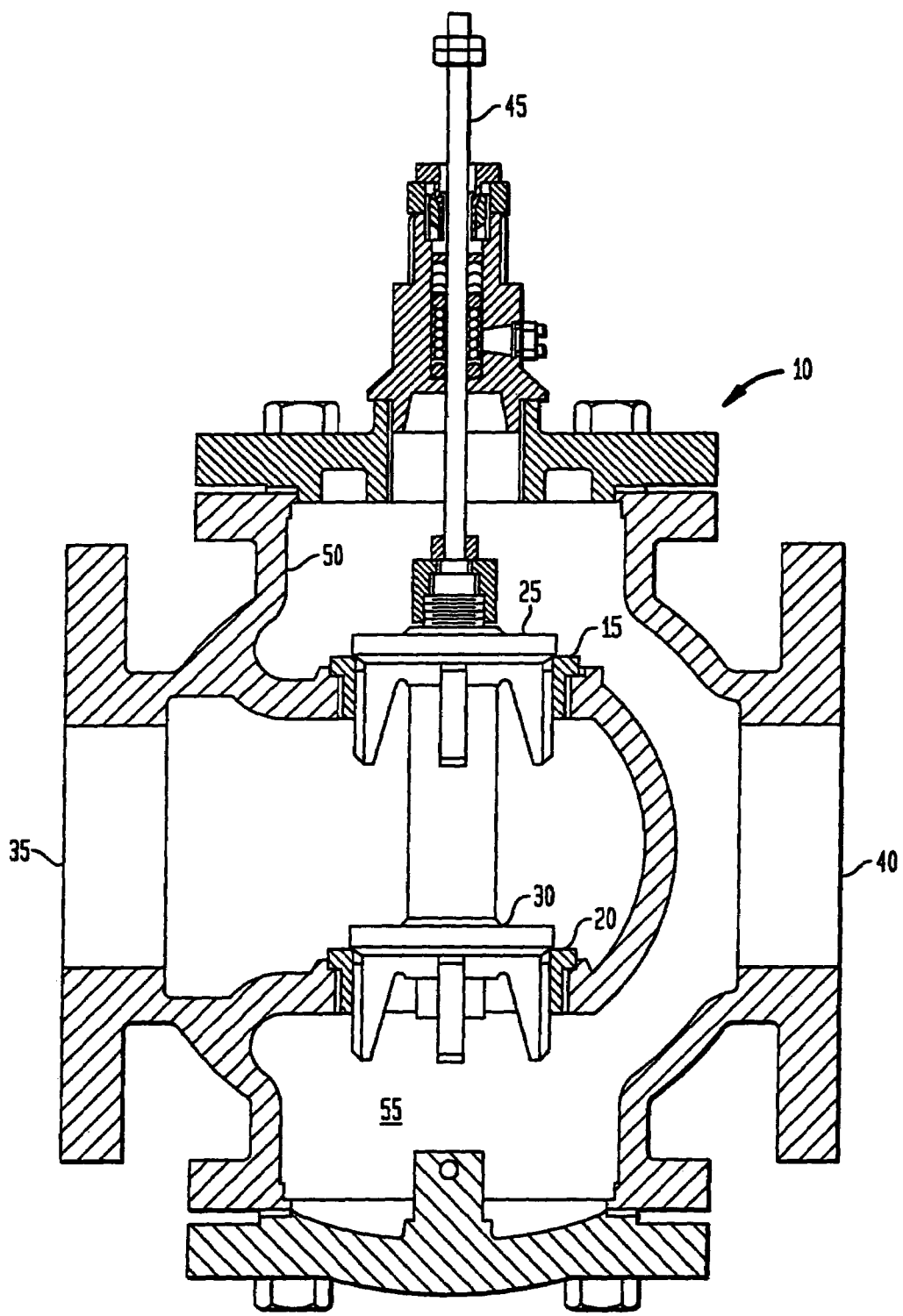
FIG. 1. is a cross-sectional schematic illustration of a conventional two-seated balanced valve.
Figure 2:
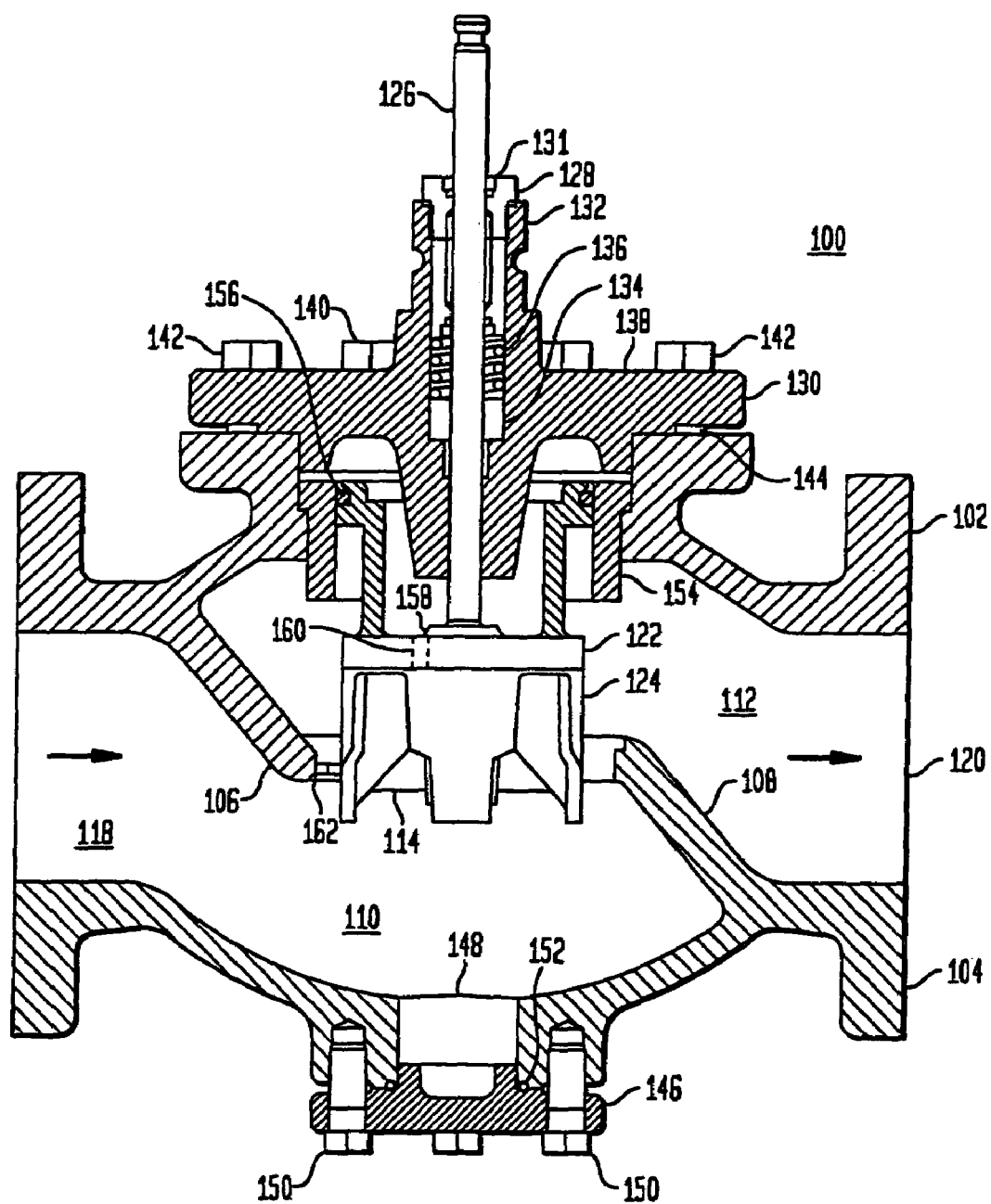
FIG. 2 is a cross-sectional schematic illustration of a normally-open single seated balanced valve in accordance with one aspect of the present invention.

FIG. 2 is a cross-sectional illustration of a balanced valve in a normally open position according to the present invention. The illustrated conventional valve 100 is operatively connected to an actuator (not shown). The actuator is typically a powered device that controls the opening and closing of the valve. Valve 100 is comprised of a first body portion 102, second body portion 104, and web portions 106 and 108 which extend between the first body portion 102 and the second body portion 104 to divide the valve body 100 into two chambers 110 and 112. Provided between the web portions 106 and 108 is valve plug seat 114 which is provided to accommodate valve plug 116. Fluid flowing through valve 100 flows from inlet port 118 through chamber 110 into chamber 112 through the valve plug seat 114 and from the outlet chamber 112 out through outlet port 120.

Valve plug 116 is provided with a first side 122 and a second side 124. Stem 126 is connected to the first side 122 of valve plug 116. Packing gland 128 is provided as a seal around valve stem 126, and also acts as a guide to keep the valve stem 126 from moving laterally within valve body 100. Packing gland 128 is provided to seal leakage between the valve stem 126 and the bonnet 130. Gasket 132 is provided between packing gland 128 and bonnet 130. Bonnet 130 is provided to encapsulate the components within the valve assembly 100. Bonnet 130 holds therein valve stem 126, bearing assembly 134, spring assembly 136 and packing gland 128. The actuator not shown gets mounted to the bonnet 130 at the top of the bonnet 130. Bonnet 130, bearing assembly 134, spring assembly 136 and packing gland 128 together form bonnet assembly 138 which is located in the aperture 140 of the first body portion 102. Bonnet 130 is secured to the upper portion 102 of valve body 100 by cap screws 142 extending through bores in the bonnet 130. Other means such as bolts, slots, combinations thereof, and the like may be used to secure bonnet 40. Gasket 144 is provided to provide a seal between the bonnet 144 and the valve body 100. Bearing assembly 134 guides the valve stem 126 and provides lubrication. For exemplary purposes only, the bearing 134 may be a sintered bronze oil-impregnated bearing. Spring assembly 136 provides a biasing pressure against bearing 134.

Connected to the second body portion 104 is cap 146 which is provided to cover aperture 148 in the second body portion 104. Cap screws 150 are provided to secure the cap 146 to the second body portion 104. A seal 152 may be provided to prevent leakage between the valve body 104 and the cap 146. In a preferred embodiment, seal 152 is a O-ring, but various types of sealing devices may be used in place of an O-ring.

Plug 116 is guided by plug guide 154 which together with sealing ring 156, gasket 130 and the first side 122 of plug 116, provide an upper pressure chamber 158 in the valve body 100. The purpose of the upper pressure chamber 158 is to provide a container to balance fluid pressure and to also guide the plug 116. Plug 116 is provided with a pressure port 160 which is the channel through the valve plug 116 which will allow the pressure at the bottom of the plug 116 to enter the upper pressure chamber 158. Plug 116 accordingly provides two functions in the preferred embodiment: to modulate flow through the inlet port 118 and the outlet port 120, and to balance the pressure between ports 118 and 120. The problem with existing control valves is that the inlet pressure in chamber 110 may be higher than the outlet pressure in chamber 112, which may create unwanted hydraulic effects on plug 116. According to the present invention, pressure port 160 allows fluid to flow into upper chamber 158, such that equal pressure is placed upon valve plug 116 to counteract the hydraulic effects on the plug 116 created by differential pressure between the inlet pressure in chamber 110 and the outlet pressure in chamber 112.

In operation, valve stem 126 is operatively connected to an actuator (not shown) that transmits force to move the valve plug 116. In valve shown in FIG. 2, when no actuator force is applied to the valve stem 126, the valve plug 116 is located such that the valve 100 is in a normally open position. The actuator, which may be provided with fail-safe circuitry, may be used to move the stem 126 such that the valve plug 116 is pressed down against seat ring 114 such that the inlet port 118 and the outlet port 120 are isolated. Anti-rotation pin 162 located in proximity to the seat ring 114 keeps valve plug 116 from rotating.

Figure 3:
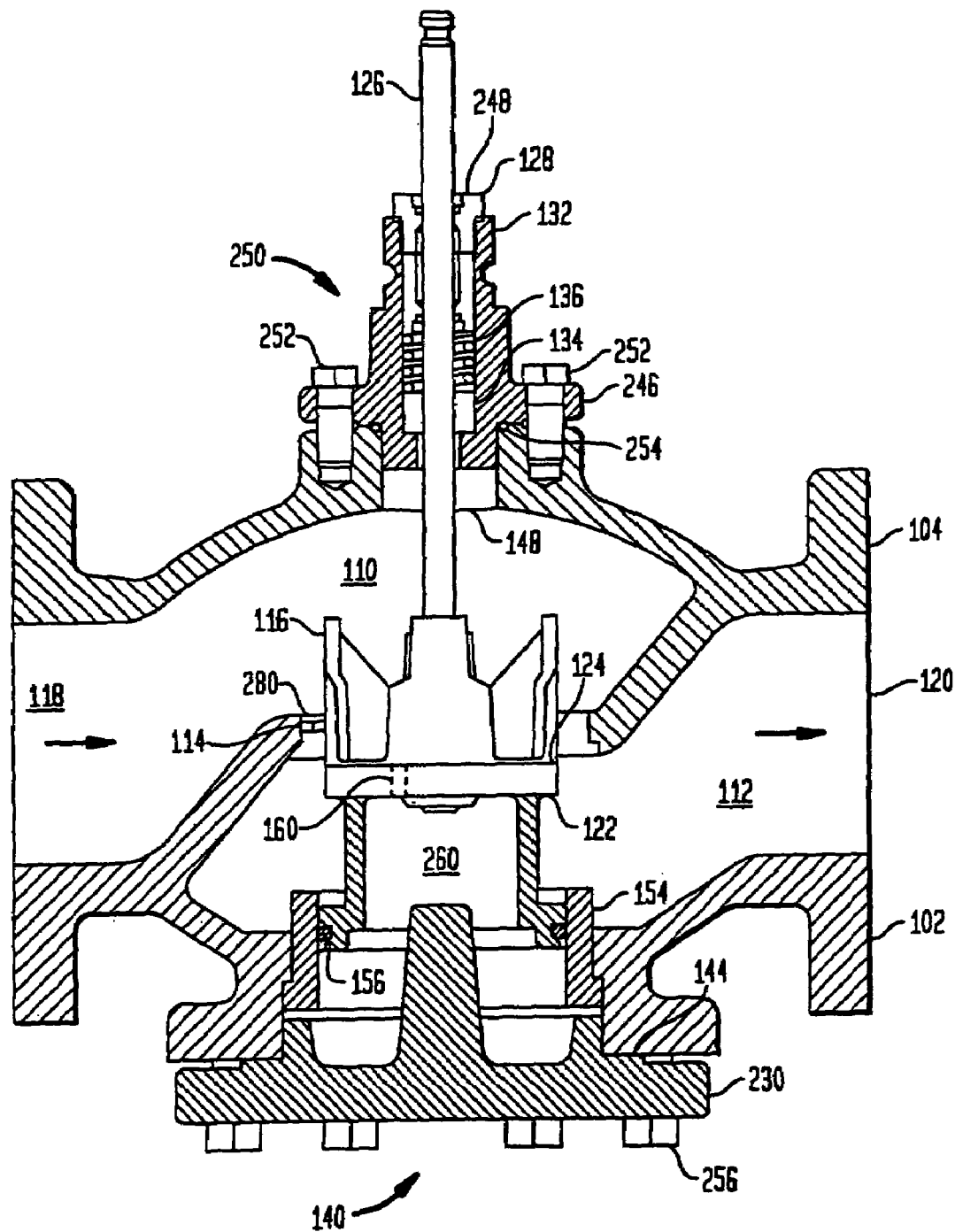
FIG. 3 is a cross-sectional schematic illustration of a balanced normally-closed single seated valve in accordance with one aspect of the present invention.

FIG. 3 is a cross-sectional illustration of the balanced valve of the present invention in a normally closed configuration. As shown in FIG. 3, cap 246 differs from cap 146 shown in FIG. 2 in that cap 246 is provided with aperture 248 to secure the stem 126, and bonnet 130 has been replaced with bonnet 230 which is no longer provided with an aperture so that the bonnet 130 may completed seal off aperture 140 in first body portion 102. As shown in FIG. 3, cap 246 is used to encapsulate the valve stem 126, bearing assembly 134, spring assembly 136 and packing gland 128 in the same manner as bonnet 130 in FIG. 2. Together these elements comprise cap assembly 250.

Cap 246 is secured to the second body portion 104 of valve body 100 using cap screws 252. In another embodiment cap 246 may be integral to the valve body 100. A seal 254 may be provided to prevent leakage between the valve body 100 and the cap 246. Attached to the first body portion 102 of the valve body 100 is bonnet 230. Bonnet 230 is secured to the first body portion 102 using screws 256. Gasket 144 is provided to provide a seal between the bonnet 230 and the first body portion 102. The plug 116 relative to the valve body 100 is in the same position for normally closed valve as it is for the normally open valve, except the stem is reversed and rotated 180 degrees.

Plug 116 is guided by plug guide 154 which together with sealing ring 156 and the first side 122 of plug 116, provide a lower pressure chamber 260 in the valve body 100. The purpose of the lower pressure chamber 260 is to provide a container to balance fluid pressure and to also guide the plug 116. Plug 116 is provided with a pressure port 160 which is the channel through the valve plug 116 which will allow the pressure at the second side of the plug 116 to enter the lower pressure chamber 260. As was the case with respect to FIG. 2, plug 25 shown in FIG. 3 accordingly provides two functions in the preferred embodiment: to modulate flow through the inlet port 118 and the outlet port 120, and to balance the pressure between ports 118 and 120. According to the present invention, pressure port 160 allows fluid to flow into lower chamber 260, such that balancing pressure is placed upon valve plug 116 to counteract the hydraulic effects on the plug 116 created by differential pressure between inlet pressure of chamber 110 and outlet pressure of chamber 112.

In operation, valve stem 126 is operatively connected to an actuator (not shown) that transmits force to move the valve plug 116. In valve shown in FIG. 3, when no actuator force is applied to the valve stem 126, the valve plug 116 is located in a normally extended position such that the valve 100 is in a normally closed position. The actuator may be used to move the stem 126 such that the valve plug 116 is raised away from the plug guide 154 so that the valve 100 is in an open position and the chambers 110 and 112 have an open position between them through which fluid may flow. Anti-rotation pin 280 located in proximity to the seat ring 114 keeps valve plug 116 from rotating.

Figure 4:
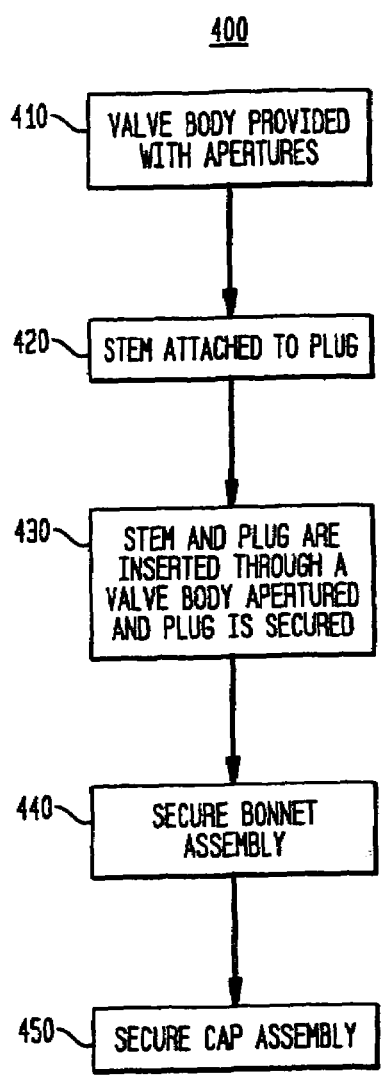
FIG. 4 is a flow diagram showing the steps involved in assembling the normally-open single seated vale of FIG. 2.

Referring now to FIG. 4, there is depicted a flowchart, generally designated 400, of an exemplary manner of operation of the subject invention. This flowchart 400 is described with reference to the assembly of the normally open balanced valve shown in FIG. 2. It should be appreciated that the manner of operation depicted in the flowchart 400 of FIG. 4 is only exemplary of one manner in which the subject invention functions. Other manners, as well as additional steps, less steps, or modified steps constitute valid functioning of the subject invention in accordance with the present principles.

FIG. 4 shows a method for manufacturing the normally open balance valve shown in FIG. 2. Valve body 100 is provide with aperture 140 through which the valve stem 126 and plug 116 are inserted and which the bonnet 130 closes after being secured to the valve body 100 and is provided with aperture 148 in which the cap assembly 146 will be attached. In the present invention, it does not matter whether the assembly for the first aperture 140 or the second aperture 148 is completed first. Accordingly, while FIG. 5 shows the bonnet assembly 138 for aperture 140 being assembled first, the cap assembly 146 for aperture 148 may be assembled first.

The flowchart 400 begins with step 410. In step 410, a valve body 100 is provided with aperture 140 provided in the first portion 102 of the valve 100 and a second smaller aperture 148 in the second portion 104 of the valve body 100. In step 420, the stem 126 is attached to the first side 122 of plug 116. In one embodiment, the stem 126 can be riveted to the first side 122 of plug 116 so that the connection is secure. Before the combined stem 126 and plug 116 are inserted into the aperture 140 of valve 100, plug guide 154 is inserted into aperture 140 and secured to the first portion 102 of the valve body 100. In step 430, once the plug guide 154 is in place, the plug 116, with stem 126 connected, is inserted through the aperture 140 and is guided into place upon seat ring 114.

In step 440, after the plug 116 and stem 126 have been inserted into the aperture 140 of valve body 100, bonnet assembly 130 is secured in place to the valve 100. Bonnet 130 is first secured in place to the first portion 102 of the valve body 10 using screws 142. Once bonnet 130 is secured in place, the bonnet 130, seal 156 and the first side 122 of plug 122 together form pressure chamber 118. Bonnet 130 is provided with an aperture 131 to accommodate the stem portion 126. After the bonnet 130 has been secured in place, bearing 134 is then inserted in the aperture 131 of bonnet 130. Spring 136 is then inserted into the aperture 131 of bonnet 130 to rest upon bearing 134. Gasket 132 then provided on the upper surface of bonnet 130 and packing gland 128 is inserted into the aperture 131 over the stem 126 so that the bonnet 130 is sealed from the packing gland 128 by gasket 132. In step 450, once bonnet assembly 138 has been assembled in place, lower cap assembly 146 may be secured to the second portion 104 of the valve body 100 using screws 150 such that gasket 152 is provided between the cap 146 and second body portion 104.

Figure 5:
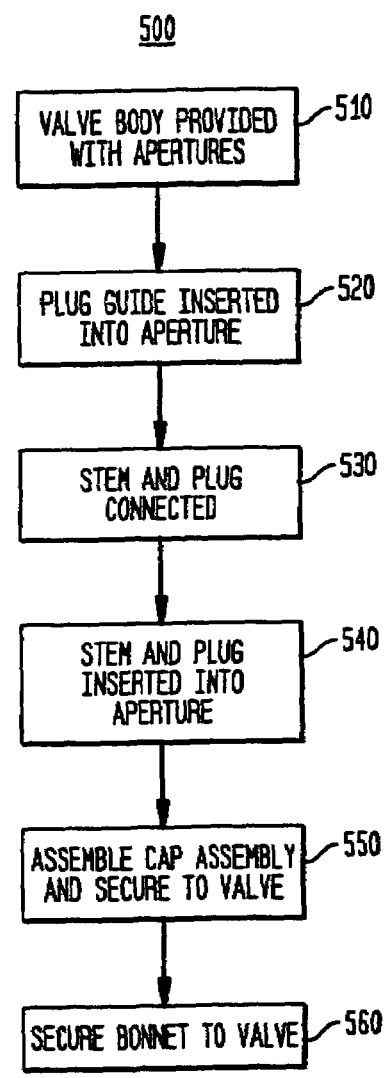
FIG. 5 is a flow diagram showing the steps involved in assembling the normally-closed single seated valve of FIG. 3.

Referring now to FIG. 5, there is depicted a flowchart, generally designated 500, of an exemplary manner of operation of the subject invention. This flowchart 500 is described with reference to assembly of the normally closed balanced valve 10 of FIG. 3. It should be appreciated that the manner of operation depicted in the flowchart 500 of FIG. 5 is only exemplary of one manner in which the subject invention functions. Other manners, as well as additional steps, less steps, or modified steps constitute valid functioning of the subject invention in accordance with the present principles.

The steps for assembling the normally closed balanced valve are similar to the steps for assembling the normally open valve. The fundamental difference is that the stem 126 is connected to the second side 124 of valve plug 116 instead of the first side 122 of the valve plug 116, so that the stem 126 now extends through aperture 148 instead of aperture 140. As a result, a different bonnet 230 must be provided that is not provided with an aperture, and a different cap 246 must be provided having an aperture 248 to accommodate the valve stem 126, the bearing assembly 134, spring 136 and the packing gland 128. Valve body 100 is provided with aperture 140 in which the bonnet 130 and valve 116 and stem 126 assembly will be inserted, and is provided with aperture 148 in which the cap assembly 250 will be attached. In the present invention, it does not matter whether the assembly for the first aperture 140 or the second aperture 148 is completed first after the plug 116 and stem 126 have been secured inside the valve body 100. Accordingly, while FIG. 6 shows the cap assembly 250 for aperture 148 being assembled first, the bonnet assembly 130 for aperture 140 may be assembled first.

The flowchart 500 begins with step 510. In step 510, a valve body 100 is provided with aperture 140 provided in the first portion 102 of the valve and a second smaller aperture 148 in the second portion 104 of the valve body 100. As shown in step 520, when assembling a normally closed balanced valve, plug guide 154 is inserted into aperture 140 of the first portion 102 of the valve body 100 and is secured in place. In step 530, stem 126 is then connected to side 124 of plug 116. In step 540, the plug 116 and stem 126 are then inserted through aperture 140. The guide 154 guides the plug 116 and stem 126 assembly in place. Once the stem 126 and plug 116 have been inserted into the valve body 100, stem portion 126 will extend through aperture 148. In step 550, the cap assembly 250 is put together. Cap 246 having an aperture 248 is inserted into aperture 148 so that stem 126 can extend through the aperture 148. Screws 252 are then used to secure cap 246 to second side 104 of valve body 104. Once the cap 246 has been secured to the valve body 100, bearing 134 is then inserted in the aperture 148 of cap 246. Spring 136 is then inserted into the aperture 248 of cap 246 to rest upon bearing 134. Gasket 132 is then provided on the upper surface of bonnet 140 and packing gland 128 is inserted into the aperture 248 over the stem 126 so that the cap 246 is sealed from the packing gland 128 by gasket 132.

In step 560, bonnet 230 may then be secured to the first portion 102 of valve body 100 to seal aperture 140. Gasket 144 may be provided between the bonnet 230 and the first portion 102 before the bonnet 230 is secured to the first portion 102 using screws 256. Once the bonnet 230 is secured to the first portion 102, bonnet 230, sealing ring 156 and the second side 112 of plug 116 form pressure chamber 260.

Figure 6:
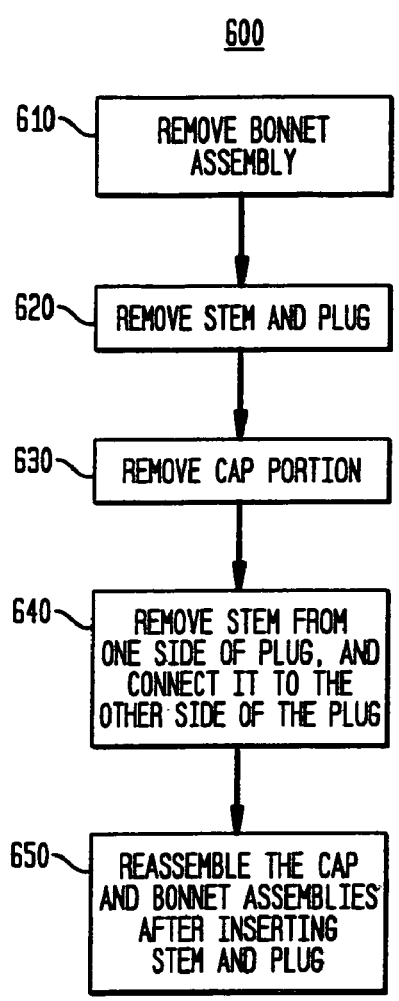
FIG. 6 is a flow diagram illustrating the steps in converting the normally open balanced valve of FIG. 2 to the normally-closed balanced valve of FIG. 3.

Referring now to FIG. 6, there is depicted a flowchart, generally designated 600, of an exemplary manner of operation of the subject invention. This flowchart 700 is described with reference to the conversion of a normally open balanced valve shown in FIG. 2 to a normally closed balanced valve, shown in FIG. 3. It should be appreciated that the manner of assembly depicted in the flowchart 600 of FIG. 6 is only exemplary of one manner in which the subject invention functions. Other manners, as well as additional steps, less steps, or modified steps constitute valid functioning of the subject invention in accordance with the present principles.

The flowchart 600 begins with step 610. In step 610, the gasket assembly 138 can be removed from the first portion 102 of the valve body 100. Next, in step 620, the stem 126 and plug 116 assembly is removed from the valve body 100 through the aperture 140. In step 630, cap portion 146 may then be removed. In step 640, the stem is removed from the first side 122 of plug 25, and is then connected to the second side 124 of plug 116. In step 650, the valve may then be assembled according to the method shown in FIG. 5.

Figure 7:
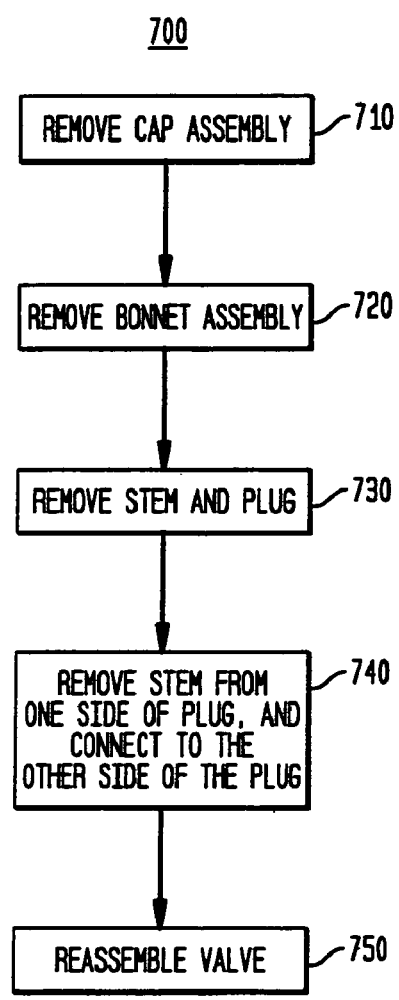
FIG. 7 is a flow diagram illustrating the steps in converting the normally closed balanced valve of FIG. 3 to the normally open balanced valve of FIG. 2.

Referring now to FIG. 7, there is depicted a flowchart, generally designated 700, of an exemplary manner of operation of the subject invention. This flowchart 700 is described with reference to the conversion of a normally closed balanced valve shown in FIG. 3 to a normally closed balanced valve, shown in FIG. 2. It should be appreciated that the manner of assembly depicted in the flowchart 700 of FIG. 7 is only exemplary of one manner in which the subject invention functions. Other manners, as well as additional steps, less steps, or modified steps constitute valid functioning of the subject invention in accordance with the present principles.

The flowchart 700 begins with step 710. In step 710, the cap assembly 250 can be removed from the second portion 104 of the valve body. In step 720, gasket assembly 230 may then be removed from the first body portion 102 of valve body 10. In step 730, the plug 116 and stem 126 assembly may then be removed from the aperture 140 of the first body portion 102. In step 740, stem 126 is removed from the second side 124 of plug 116 and then connected to the first side 122 of plug 116. In step 750, the valve may then be assembled according to the method shown in FIG. 4.

Figure 8:
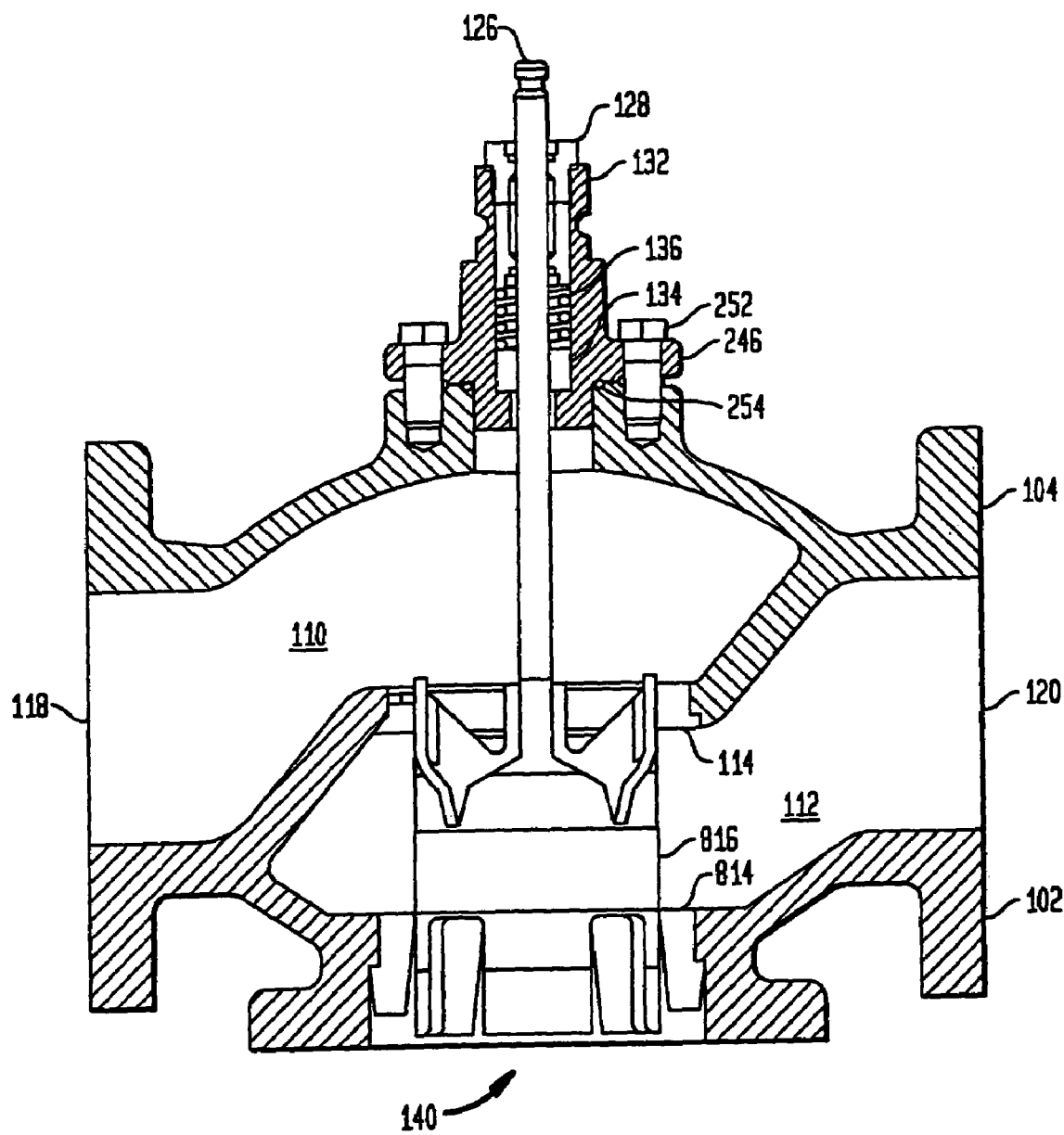
FIG. 8 cross-sectional schematic illustration of the valve body 10 capable of being used as a three-way valve.

FIG. 8 is a cross-sectional illustration of a valve body 10 being used for a three-way valve. The embodiment shown in FIG. 8 is identical to the embodiment shown in FIG. 3, except that plug 816 has been modified from plug 116 and lower seat member 814 has been provided to accommodate the lower portion of plug 816. Further, bonnet 230 has been removed such that aperture 148 can be used as a second inlet portion so that the valve body 100 can be used as a three way valve. The plug 816 is shown in FIG. 8 sealing the aperture 140 such that fluid flows from inlet 118 to outlet 120. However, an actuator can be used to raise plug 816 up into valve body 10 such that fluid flow from inlet 118 is sealed off from outlet 120, and fluid may flow from aperture 140 to outlet 120.

It will be appreciated that the above described embodiments are merely exemplary and that those of ordinary skill in the art may readily devise their own implementations that incorporate the principles of the present invention and fall within the spirit and scope thereof. For example, the invention is not limited to the exact methods set forth in the FIG. 3–7 for assembling the normally-open balanced valve and the normally closed balanced valve.

What is claimed is:

1. A normally-open balanced valve comprising:
 a valve body comprising an inlet port and an outlet port, said valve body further comprising a first side and a second side, said first side and said second sides each provided with apertures, wherein the aperture in said first side is larger than the aperture in said second side wherein said aperture in said first side is provided such that said normally open balanced valve is capable of being converted into a three-way valve, said valve comprising a portion extending between said first side and said second side for dividing the valve into an inlet chamber and an outlet chamber, said valve provided with a plug provided in a position such that an opening between the inlet chamber and the outlet chamber is normally open, said plug having a first side and a second side, said plug provided with a pressure port allowing fluid to flow from said second side of said plug side of said plug to said first side of said plug into a pressure chamber provided in said valve such that fluid flows from said inlet chamber through said port into said pressure chamber to balance the fluid pressure on said plug, and a stem connected to said first side of said plug for moving said plug into a closed position when actuated.

2. The balanced valve according to claim 1, wherein a bonnet assembly is provided in said aperture provided in said first side of said valve, said bonnet assembly provided to secure the stem in place.

3. The balanced valve according to claim 2, wherein the bonnet assembly further comprises a bearing, a spring assembly and a packing gland.

4. The balanced valve according to claim 1, wherein a cap assembly is provided to seal said aperture in the second side of the valve.

5. The balanced valve according to claim 1, wherein said first aperture is provided so that the balanced valve can be converted into a three way valve by providing a plug having an upper seat and a lower seat so that the balanced valve can operate as a three way valve.

6. The balanced valve according to claim 1, wherein said first aperture is provided so that the balanced valve can be converted into a three way valve by providing a plug having an upper seat and a lower seat so that the balanced valve can operate as a three way valve.

7. A normally closed balanced valve comprising:
 a valve body comprising an inlet port and an outlet port, said valve body further comprising a first side and a second side, said first side and said second sides each provided with apertures, wherein the aperture in said first side is larger than the aperture in said second side wherein said aperture in said first side is provided such that said normally closed balanced is capable of being converted into a three-way valve or a normally-open valve, said valve comprising a portion extending between said first side and said second side for dividing the valve into an inlet chamber and an outlet chamber such that an opening is provided between said inlet chamber and outlet chamber, said valve provided with a plug provided in a position such that said opening between the inlet chamber and the outlet chamber is normally closed, said plug having a first side and a second side provided with a pressure port allowing fluid to flow from said second side of said plug side of said plug to said first side of said plug into a pressure chamber provided in said valve such that fluid flows from said inlet chamber through said port into said pressure chamber to balance the fluid pressure on said plug, and a stem connected to said second side of said plug.

8. The balanced valve according to claim 7, wherein a cap assembly is provided in said aperture provided in said second side of said valve, said cap assembly provided to secure the stem in place.

9. The balanced valve according to claim 8, wherein the cap assembly further comprises a bearing, a spring assembly and a packing gland.

10. The balanced valve according to claim 7, wherein a bonnet assembly is provided to seal said aperture in the first side of the valve.

* * * * *